United States Patent
Song et al.

(10) Patent No.: US 9,037,196 B1
(45) Date of Patent: May 19, 2015

(54) METHOD, TERMINAL AND HEAD UNIT FOR AUTOMATICALLY PROVIDING APPLICATION SERVICES USING TEMPLATES

(71) Applicant: Obigo Inc., Gyeonggi-do (KR)

(72) Inventors: Byung Soo Song, Seoul (KR); Doo Hyun Han, Gyeonggi-do (KR); Jung Seok Lee, Gyeonggi-do (KR); Han Chul Kim, Seoul (KR)

(73) Assignee: Obigo Inc., Gyeonggi-do (KR)

( * ) Notice: Subject to any disclaimer, the term of this patent is extended or adjusted under 35 U.S.C. 154(b) by 0 days.

(21) Appl. No.: 14/469,542

(22) Filed: Aug. 26, 2014

(51) Int. Cl.
*H04M 1/00* (2006.01)
*H04W 4/20* (2009.01)

(52) U.S. Cl.
CPC .............. *H04W 4/20* (2013.01); *H04B 1/3822* (2013.01)

(58) Field of Classification Search
CPC ............ H04M 1/6091; H04M 1/6075; H04M 1/6083; B60K 11/0241; H04B 1/3877; H04W 84/18; H04W 88/06; H04W 76/02; H04W 8/245; H04W 24/02; H04W 88/02
USPC .............. 455/41.2, 41.3, 550.1, 569.1, 569.2, 455/575.1, 575.9, 418–420, 90.1
See application file for complete search history.

(56) References Cited

U.S. PATENT DOCUMENTS

| | | | |
|---|---|---|---|
| 2014/0062926 A1* | 3/2014 | Hwang et al. | 345/173 |
| 2014/0280196 A1* | 9/2014 | Jung et al. | 707/741 |
| 2014/0313353 A1* | 10/2014 | Echigo et al. | 348/207.11 |

* cited by examiner

*Primary Examiner* — Nhan Le
(74) *Attorney, Agent, or Firm* — Husch Blackwell LLP

(57) ABSTRACT

The present invention relates to a method for automatically providing an application service by an interaction with a head unit at a terminal. The method includes steps of: (a) the terminal receiving a request for running of a specific application, if the specific application is selected by a user of the head unit from a list including information on one or more runnable applications, which are installed in the terminal, to be interacted with the head unit; and (b) the terminal running the specific application by interacting with a template application run by the head unit.

12 Claims, 6 Drawing Sheets

METHOD, TERMINAL AND HEAD UNIT FOR AUTOMATICALLY PROVIDING APPLICATION SERVICES USING TEMPLATES

FIELD OF THE INVENTION

The present invention relates to a method, a terminal, and a head unit for automatically providing application services by using templates; and more particularly, to the method, the terminal and the head unit for providing application services through the templates only with a driver's minimal operations under a circumstance where the terminal and the head unit are connected through a communication channel.

BACKGROUND OF THE INVENTION

Attempts to execute applications installed in a smart phone are made through a head unit of a vehicle by the connection between the smart phone and the head unit.

Under a service circumstance where the applications installed in the smart phone are provided through the head unit, a connection enabler application of the smart phone is essentially necessary to connect the terminal and the head unit in order to control the applications.

To provide smart phone application services through the head unit, the courses of several steps, however, are required. In other words, a vehicle driver executes a connection enabler application of the smart phone directly and establishes the connection with the head unit by using the connection enabler application. After the connection is established, if the driver executes the application s/he wants to do, the application service is provided through the head unit connected with the smart phone.

But such courses cause driver distractions and inconvenience to an operation of the driver. Besides, the driver may not know any application services that could be provided through the connection enabler application. In addition, if an appropriate application for a vehicle and its head unit fails to be executed, a problem may occur in the usability of the application.

Accordingly, the inventors of the present invention came to develop a technology of allowing a terminal and the head unit of a vehicle to interact with each other automatically by the function of a connection enabler application if the terminal such as a smart phone and the head unit of the vehicle are connected with each other and allowing the services of a variety of applications installed in the terminal to be provided through templates of the head unit with a driver's minimal operations.

SUMMARY OF THE INVENTION

It is an object of the present invention to solve all the problems mentioned above.

It is another object of the present invention to allow a terminal and a head unit of a vehicle to interact with each other automatically by the function of a connection enabler application if the terminal such as a smart phone and the head unit of the vehicle are connected with each other; and allow a plurality of applications installed in the terminal to be provided through templates of the head unit with a driver's minimal operations.

In accordance with one aspect of the present invention, there is provided a method for automatically providing an application service by an interaction with a head unit at a terminal, including steps of: (a) the terminal receiving a request for running of a specific application, if the specific application is selected by a user of the head unit from a list including information on one or more runnable applications, which are installed in the terminal, to be interacted with the head unit; and (b) the terminal running the specific application by interacting with a template application run by the head unit.

In accordance with another aspect of the present invention, there is provided a method for automatically providing a service of an application installed in a terminal by an interaction with the terminal; including the steps of: (a) a head unit receiving a list including information on one or more runnable applications to be interacted with itself among one or more applications installed in the terminal from the terminal; (b) the head unit executing a template application corresponding to a specific application, if being selected by a user of the head unit from the list of one or more runnable applications to be interacted with itself and transferring a request for the running of the selected specific application to the terminal; and (c) the head unit allowing the selected specific application to be run in a specific template provided by the template application through the interaction with the terminal.

In accordance with still another aspect of the present invention, there is provided a terminal for automatically providing an application service by an interaction with a head unit, including: a communication part for receiving a request for running of a specific application, if the specific application is selected by a user of the head unit from a list including information on one or more runnable applications, which are installed in the terminal, to be interacted with the head unit; and a processing part for running the specific application by interacting with a template application run by the head unit.

In accordance with still yet another aspect of the present invention, there is provided a head unit for automatically providing a service of an application installed in a terminal by an interaction with the terminal, including: a communication part for receiving a list including information on one or more runnable applications to be interacted with the head unit among one or more applications installed in the terminal from the terminal; and a processing part for executing a template application corresponding to a specific application, if being selected by a user of the head unit from the list of one or more runnable applications to be interacted with the head unit, and transferring a request for running of the selected specific application to the terminal, and then allowing the selected specific application to be run in a specific template provided by the template application through the interaction with the terminal.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
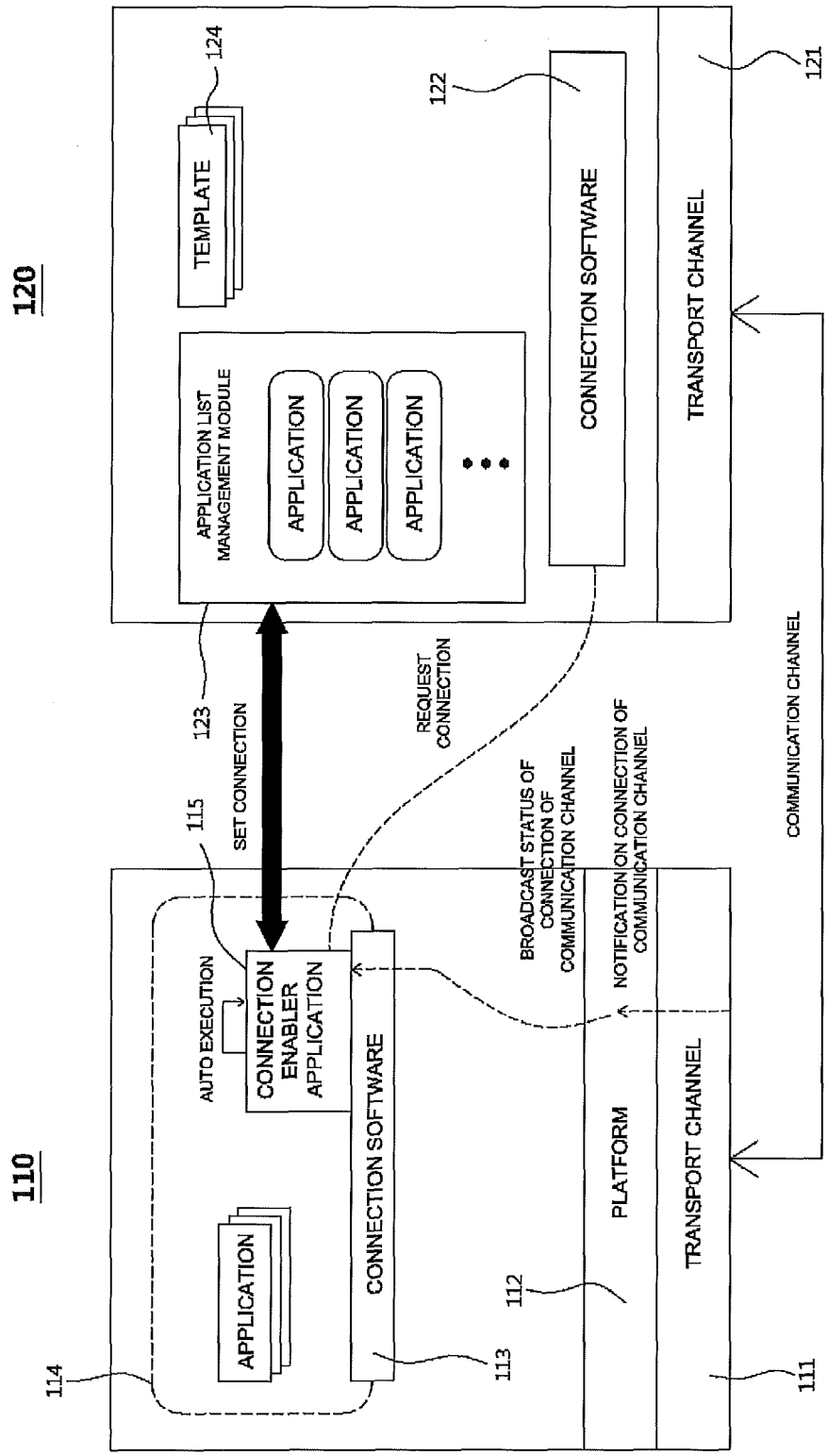
FIG. 1 is a drawing exemplarily showing the configuration of a whole system that provides services of applications of a terminal through a head unit in accordance with the present invention.

The detailed description of the present invention illustrates specific embodiments in which the present invention can be performed with reference to the attached drawings.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the location or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present invention to be carried out easily, the example embodiments of the present invention by referring to attached diagrams will be explained in detail as follows:

Configuration of Whole System

FIG. 1 is a drawing exemplarily showing the configuration of a whole system that provides services of applications of a terminal through templates provided by a head unit in accordance with the present invention.

As illustrated in FIG. 1, the whole system of the present invention may include a terminal 110 and a head unit 120.

In accordance with an example embodiment of the present invention, the whole system of the present invention may provide services of applications installed in the terminal 110 through templates executed in the head unit 120 under an environment where the terminal 110 and the head unit 120 are connected with each other through a wired or a wireless communication channel. For example, a user may execute an application installed in the terminal 110 through the head unit 120 and check the execution result through the template of the head unit 120. Besides, the user may operate the application executed in the terminal 110 through the user interface of the template provided by the head unit 120.

The terminal 110 in accordance with an example embodiment of the present invention may be a mobile device, such as a smart phone, tablet PC, or laptop, where applications may be installed and services of the installed applications may be provided through the head unit 120.

In accordance with an example embodiment of the present invention, the terminal 110 may operate a platform 112, connection software 113 and one or more applications 114. The platform 112 may be a platform of a smart phone, etc.

In accordance with an example embodiment of the present invention, the one or more applications 114 may be one or more applications installed in the terminal 110 and also may include a connection enabler application 115. In addition, all or some of the one or more applications 114 may be run by interacting with the head unit 120 connected with the terminal 110. Runnable applications to be interacted with the head unit 120 may use connection software 113 to interact with the head unit 120.

In accordance with an example embodiment of the present invention, the head unit 120 may operate connection software 122, and an application list management module 123.

In accordance with an example embodiment of the present invention, the head unit 120 may operate one or more templates. The templates may be a human-machine interface (HMI) template. The one or more templates may be templates by types to get application services of the terminal 110. For instance, each of one or more runnable applications to be interacted with the head unit 120 may be connected with one of the one or more templates. Each application may be classified by type and run by being connected with the corresponding template.

In accordance with an example embodiment of the present invention, the terminal 110 and the head unit 120 may be connected through a communication channel. A transport channel 111 of the terminal 110 may represent the communication channel of the terminal 110 and a transport channel 121 of the head unit 120 may be the communication channel of the head unit 120. In other words, the transport channel 111 of the terminal 110 and the transport channel 121 of the head unit 120 may be the communication channel connected between the terminal 110 and the head unit 120.

In accordance with an example embodiment of the present invention, the terminal 110 and the head unit 120 may be connected through a variety of transmission media. The terminal 110 and the head unit 120 may be connected with each other through a wired or a wireless network. For example, the terminal 110 and the head unit 120 may be connected with each other through a wired network such as universe serial bus (USB) or a wireless network such as Bluetooth (BT), and WiFi.

If detecting the connection with the head unit 120, the terminal 110 in accordance with an example embodiment of the present invention may transfer a notification on the connection to the platform 112 thereof. Receiving the notification, the platform 112 may broadcast a status of the connection with the head unit to one or more applications, including the connection enabler application 115. Herein, the one or more applications may be those which request an alarm on the status of the connection with the head unit 120. The terminal 110 may use the connection software 113 to broadcast the status of the communication channel.

In accordance with an example embodiment of the present invention, if the connection between the terminal 110 and the head unit 120 is detected through the course as specified above, the connection enabler application 115 may be automatically executed. That is, if receiving the alarm on the connection with the head unit 120, the connection enabler application 115 may execute itself.

Next, the connection enabler application 115 may request the connection software 122 of the head unit 120 to be connected with the application list management module 123 which manages a list of the applications of the head unit 120. That is, the connection enabler application 115 may request the connection with the application list management module 123. By responding to the request for the connection with the application list management module 123, the connection software 122 of the head unit 120 may set the connection between the connection enabler application 115 and the application list management module 123. If the connection between the connection enabler application 115 and the application list management module 123 is set, a basic environment under which a user of the head unit 120 may run the application of the terminal 110 may be provided.

If the connection with the head unit 120 is set, the connection enabler application 115 in accordance with an example embodiment of the present invention may automatically create a list of one or more runnable applications to be interacted with the head unit 120 connected with the terminal 110 among applications installed in the terminal 110 and may transfer the list to the head unit 120 to allow the user of the head unit 120 to select a specific application among the applications included in the list and allow the selected specific application to be run.

In accordance with an example embodiment of the present invention, the application list management module 123 of the head unit 120 may receive the list of one or more runnable applications to be interacted with the head unit 120 from the connection enabler application 115 in the terminal 110. The application list management module 123 may display information on the one or more runnable applications to be interacted with the head unit 120 by referring to the received list.

In accordance with an example embodiment of the present invention, the head unit 120 may display information on one or more runnable applications to be interacted therewith among the one or more applications installed in the terminal 110. If the information on the applications is displayed, a basic environment under which the user of the head unit 120 may run the application of the terminal 110 may be provided.

In accordance with an example embodiment of the present invention, the pre-described courses may be automatically performed without any interaction of the user if the terminal 110 and the head unit 120 are connected with each other.

Next, the course of the specific application selected by the user among one or more runnable applications to be interacted with the head unit 120 in accordance with an example embodiment of the present invention will be explained in details below by referring to FIG. 2.

Figure 2:
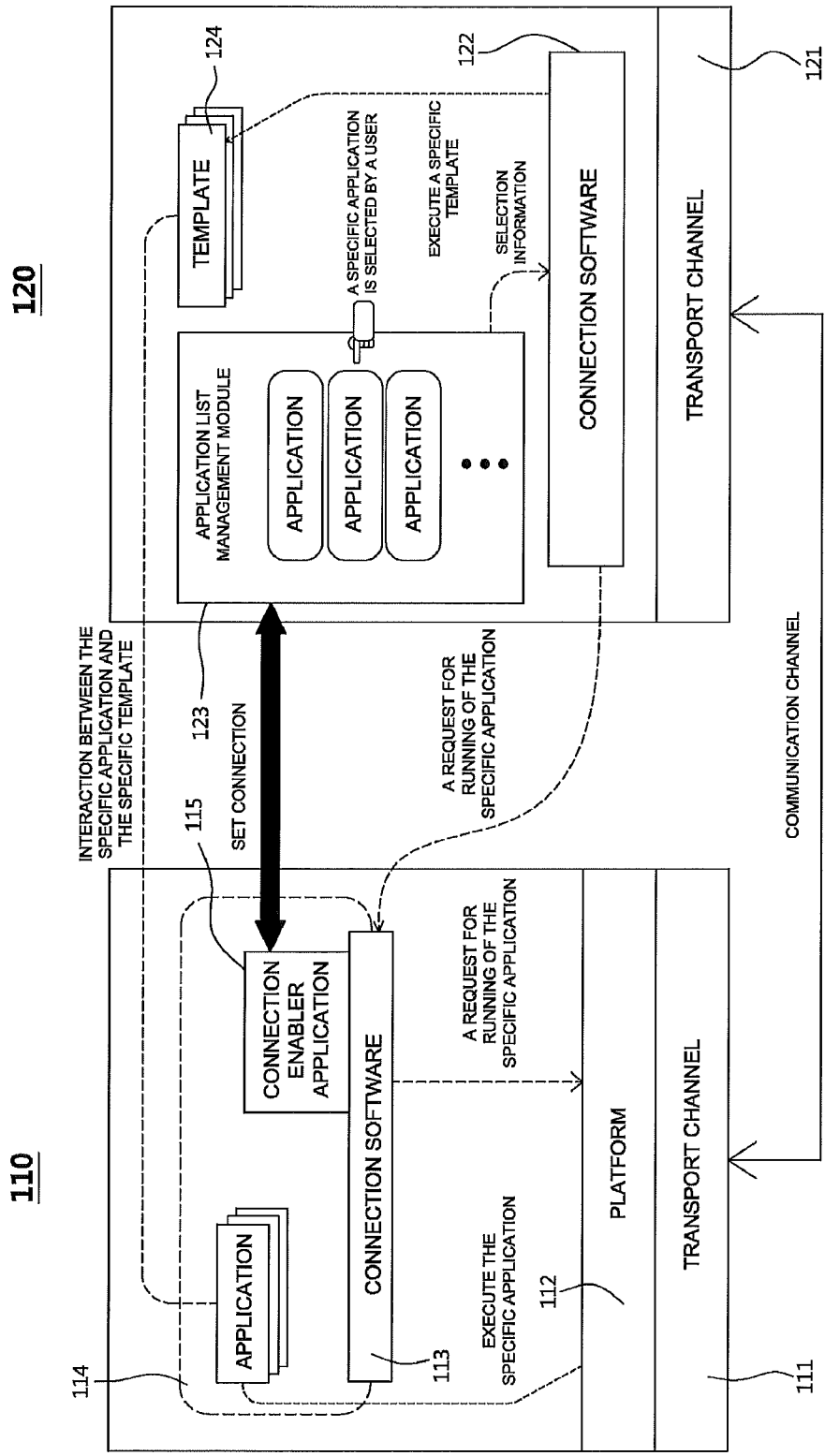
FIG. 2 is a drawing exemplarily representing the running of an application by interaction between the terminal and the head unit of the system in accordance with an example embodiment of the present invention.

FIG. 2 is a drawing exemplarily representing the running of an application by interaction between the terminal and the head unit of the system in accordance with an example embodiment of the present invention.

In accordance with an example embodiment of the present invention, if information on one or more runnable applications to be interacted with the head unit 120 is displayed, the user may select a specific application to be run among the one or more runnable applications to be interacted with the head unit 120. In other words, the user may select the specific application to be run by referring to the information on the one or more runnable applications to be interacted with the head unit 120.

In accordance with an example embodiment of the present invention, if the specific application to be run is selected by the user, the course to be described later may be automatically performed without any operation of the user.

In accordance with an example embodiment of the present invention, the application list management module 123 may receive information on the selection of the specific application selected among the one or more runnable applications to be interacted with the head unit 120 from the user of the head unit 120. The selection information may include the application selected by the user.

In accordance with an example embodiment of the present invention, the application list management module 123 may transfer the selection information to the connection software 122. The connection software 122 may execute a specific template corresponding to the specific application selected among the one or more templates 124 by using the selection information.

In accordance with an example embodiment of the present invention, the executed template may be a template application capable of providing a user interface corresponding to the specific application. For example, the executed template may be a template application with components of the user interface required to interact with the head unit 120. Through the execution of the template, an environment for the running of the selected specific application may be provided.

In accordance with an example embodiment of the present invention, the connection software 122 of the head unit 120 may transfer a request for running of the selected specific application to the connection software 113 of the terminal 110.

In accordance with an example embodiment of the present invention, the request for the running of the selected specific application may include information on the running to execute the specific application of the terminal 110. For instance, the running information may include at least one of a version of the template executed in the head unit 120, information required to set the connection with the template, and other parameters. The running information may depend on the operating system of the terminal 110.

In accordance with an example embodiment of the present invention, after receiving the request for the running of the selected specific application, the connection software 113 of the terminal 110 may transfer the request to the platform 112 of the terminal 110.

In accordance with an example embodiment of the present invention, the platform 112 may execute the selected application by using the running information and provide an execution environment for the selected specific application.

In accordance with an example embodiment of the present invention, the specific application executed on the terminal 110 and the specific template executed in the head unit 120 may be set to connect with each other. If the connection is set, the specific application may be run by interacting with the specific template. For example, if the connection between the specific application and the specific template is set, the specific application may transfer data for initial display to the specific template and the head unit 120 may display the transferred data through the executed specific template. The user may get a service of the specific application through the head unit 120 and by operating only the head unit 120.

Figure 3:
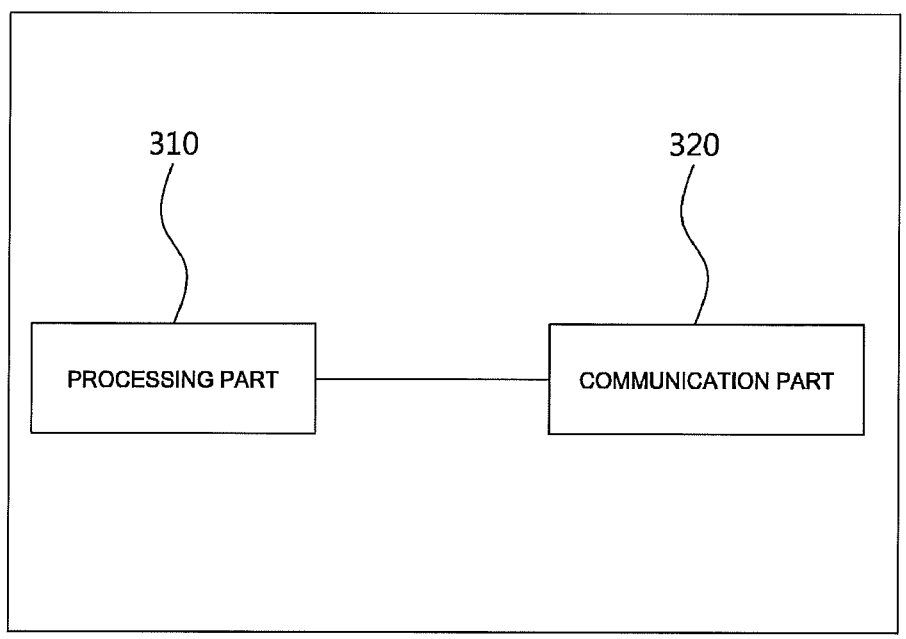
FIG. 3 illustrates a configuration of the terminal in accordance with an example embodiment of the present invention.

FIG. 3 is a configuration of the terminal 110 in accordance with an example embodiment of the present invention.

In accordance with an example embodiment of the present invention, the terminal 110 may include a processing part 310 and a communication part 320.

For reference, the one example embodiment of the present invention as described above by referring to FIG. 1 might explain functions or operations of the terminal 110 from the aspects of software components in the terminal 110, e.g., kernel or its component, process, module, service, etc., capable of providing the functions or performing the operations. The functions or the operations of such software components may be processed if the processing part 310 of the terminal 110 executes codes of the software components or the communication part 320 thereof operates by the execution of the codes. Accordingly, the functions or the operations of the transport channel 111, the platform 112, the connection software 113, the one or more applications 114, and the connection enabler application 115 as stated above by referring to FIG. 1 may be performed by the processing part 310 that executes the codes of the transport channel 111, the platform 112, the connection software 113, the one or more applications 114, and the connection enabler application 115 and by the communication part 320 that operates by the execution of the codes.

In other words, the processing part 310 may process the operations of the transport channel 111, the platform 112, the connection software 113, the one or more applications 114, and the connection enabler application 115 as described above. More specifically, the processing part 310 may execute the codes of the transport channel 111, the platform 112, the connection software 113, the one or more applications 114, and the connection enabler application 115 as explained above.

In addition, the communication part 320 may process a communication with the head unit 120. More concretely, the communication part 320 may process the operation of the communication by the execution of the codes of the transport channel 111, the platform 112, the connection software 113, the one or more applications 114, and the connection enabler application 115.

The functions of the processing part 310 and the communication part 320 in accordance with an example embodiment of the present invention will be explained in detail by referring to FIGS. 5 and 6 as shown below.

Figure 4:
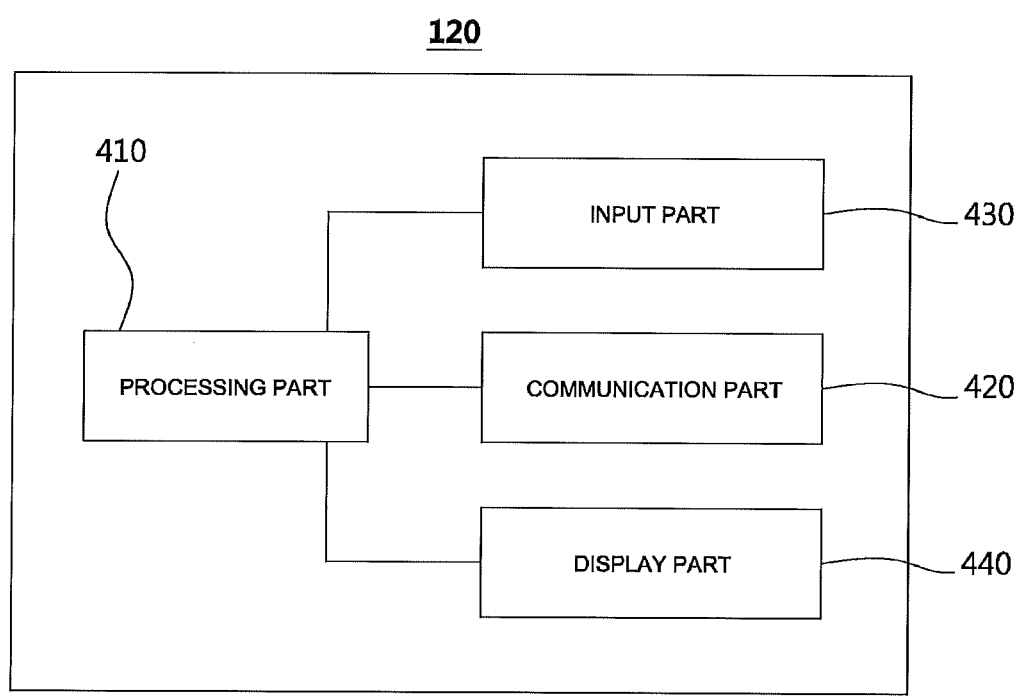
FIG. 4 shows a configuration of the head unit in accordance with an example embodiment of the present invention.

FIG. 4 shows a configuration of the head unit 120 in accordance with an example embodiment of the present invention.

In accordance with an example embodiment of the present invention, the head unit 120 may include a processing part 410, a communication part 420, an input part 430, and a display part 440.

For reference, the example embodiment of the present invention as mentioned above by referring to FIG. 1 might explain functions or operations of the head unit 120 from the aspects of software components, e.g., kernel or its component, process, module, service, etc., in the head unit 120 capable of providing the functions or performing the operations. The functions or the operations of such software components may be processed if the processing part 410 of the head unit 120 executes codes of the software components or the communication part 420, the input part 430, and the display part 440 of the head unit 120 operate by the execution of the codes. Accordingly, the functions or the operations of the transport channel 121, the connection software 122, the application list management module 123 and the one or more templates 124 as stated above by referring to FIG. 1 may be performed by the processing part 410 that executes the codes of the transport channel 121, the connection software 122, the application list management module 123, and the one or more templates 124 and by the communication part 420, the input part 430, and the display part 440 that operate by the execution of the codes.

In other words, the processing part 410 may process the operations of the transport channel 121, the connection software 122, the application list management module 123, and the one or more templates 124. More specifically, the processing part 410 may execute the codes of the transport channel 121, the connection software 122, the application list management module 123, and the one or more templates 124.

Besides, the communication part 420 may process the communication with the terminal 110. More specifically, the communication part 420 may process the operation of the communication by the execution of the codes of the transport channel 121, the connection software 122, the application list management module 123, and the one or more templates 124 as stated above.

In addition, the input part 430 may receive the input from the user of the head unit 120. More concretely, the input part 430 may process the operation of an input by the execution of the codes of the transport channel 121, the connection software 122, the application list management module 123, and the one or more templates 124 as described above.

Moreover, the display part 440 may display information to be provided for the user of the head unit 120. More distinctly, the display part 440 may process the operation of a display by the execution of the codes of the transport channel 121, the connection software 122, the application list management module 123, and the one or more templates 124 as mentioned above.

The functions of the processing part 410, the communication part 420, the input part 430, and the display part 440 in accordance with one example embodiment of the present invention will be explained in detail below by referring to FIGS. 5 and 6.

Figure 5:
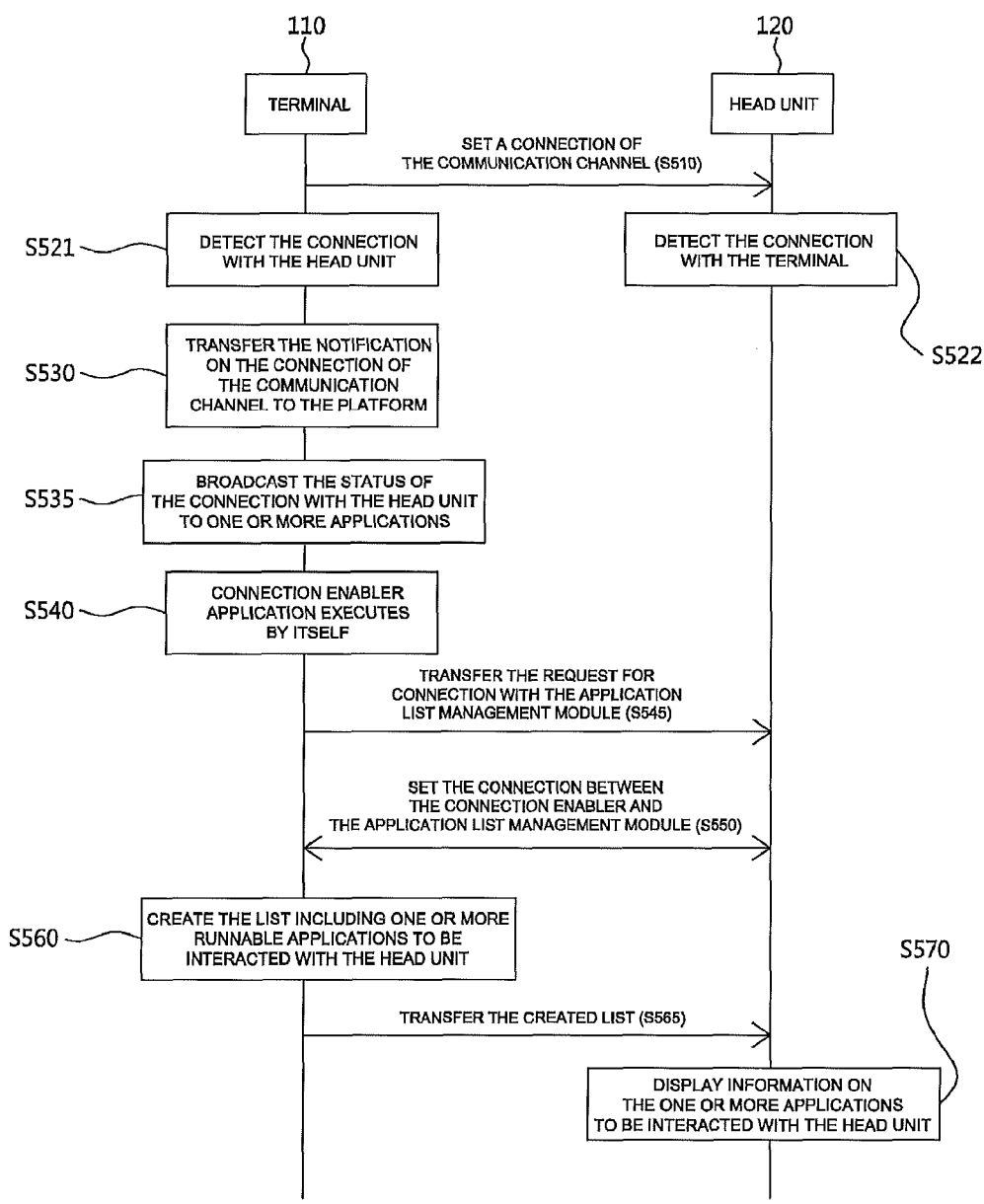
FIG. 5 is a flowchart of a method for connecting the terminal and the head unit in accordance with an example embodiment of the present invention.

FIG. 5 is a flowchart of a method for connecting the terminal and the head unit in accordance with an example embodiment of the present invention.

(i) First of all, the communication part 320 of the terminal 110 and the communication part 420 of the head unit 120 in accordance with an example embodiment of the present invention may set a connection of the communication channel between the terminal 110 and the head unit 120 at a step of S510.

(ii) Next, if the connection of the communication channel is set, the transport channel 111 of the terminal 110 in accordance with an example embodiment of the present invention may detect the connection with the head unit 120 at a step of S521. This means that the communication part 320 of the terminal 110 may detect the connection with the head unit 120.

Furthermore, as the connection is set by using the communication channel, the transport channel 121 of the head unit 120 in accordance with an example embodiment of the present invention may detect the connection with the terminal 110 at a step of S522. In other words, the communication part 420 of the head unit 120 may detect the connection with the terminal 110. For reference, it is made clear that the temporal order of the steps of S521 and S522 is not limited.

(iii) In other place, in accordance with an example embodiment of the present invention, if detecting the connection of the communication channel with the head unit 120, the transport channel 111 may transfer the notification on the connection of the communication channel to the platform 112 at a step of S530. More specifically, if the transport channel 111 detects the connection of the communication channel with the head unit 120, the processing part 310 may allow the transport channel 111 to transfer the notification on the connection to the platform 112. In other words, if the connection of the communication channel with the head unit 120 is detected by the communication part 320, the processing part 310 may transfer the notification on the connection of the communication channel to the platform 112 of the terminal 110.

(iv) In sequence, in accordance with an example embodiment of the present invention, if receiving a notification on the connection of the communication channel, the platform 112 may broadcast the status of the connection with the head unit 120 to one or more applications at a step of S535, where the one or more applications may include the connection enabler application 115. More specifically, if the platform 112 receives the notification on the connection of the communication channel, the processing part 310 may allow the platform 112 to broadcast the status of the connection with the head unit 120 to the one or more applications installed in the terminal 110. It means that the processing part 310 may broadcast the status of the connection with the head unit 120 to the one or more applications in the terminal 110 or to one or more applications which has requested an alarm on the connection with the head unit 120, as the case may be.

(v) Next, in accordance with an example embodiment of the present invention, if receiving the broadcast of the connection status, the connection enabler application 115 can execute itself at a step of S540. Through the above-stated steps of S521, S530, S535, and S540, the connection enabler application 115 may be automatically executed if the connection with the head unit 120 is detected. More specifically, the processing part 310 may allow the connection enabler application 115 to execute itself when the connection enabler application 115 receives the broadcast on the status of the connection with the head unit 120. In other words, as the status of the connection is broadcasted to the connection enabler application 115, the processing part 310 may convert a non-execution status of the connection enabler application 115 such as sleep, suspended or stopped status or a pre-execution status thereof to an execution status.

(vi) In accordance with an example embodiment of the present invention, the connection enabler application 115 may transfer the request for connection with the application list management module 123, which manages applications of the head unit 120, to the connection software 122 of the head unit 120 through the communication channel with the head unit 120 at a step of S545. More specifically, the communication part 320 may allow the connection enabler application 115 to request for connection to the application list management module 123 of the head unit 120. It means that the communication part 320 of the terminal 110 may transfer the request for connection with the application list management module 123, which manages the applications of the head unit 120, to the communication part 420 of the head unit 120 through the communication channel with the head unit 120.

Additionally, the connection software 122 of the head unit 120 in accordance with an example embodiment of the present invention may receive the request for the connection with the application list management module 123 from the connection enabler application 115 through the communication channel with the terminal 110. More specifically, the communication part 420 of the head unit 120 may allow the connection software 122 to receive the request for the connection with the application list management module 123 from the connection enabler application 115 through the communication channel with the terminal 110. In other words, the communication part 420 of the head unit 120 may receive the request for the connection with the application list management module 123 from the communication part 320 of the terminal 110 through the communication channel with the terminal 110.

(vii) Next, in accordance with an example embodiment of the present invention, by referring to the received request for the connection with the application list management module 123, the connection software 122 of the head unit 120 may set the connection between the connection enabler application 115 and the application list management module 123. Through the connection software 122, the connection enabler application 115 may set the connection with the application list management module 123 at a step of S550. More specifically, the communication part 420 of the head unit 120 may allow the connection enabler application 115 to be set to the connection with the application list management module 123 of the head unit 120 by interacting with the communication part 320 of the terminal 110. In other words, if receiving the request for the connection with the application list management module 123, the communication part 420 of the head unit 120 (and the communication part 320 of the terminal 110) may set the connection between the connection enabler application 115 and the application list management module 123 to transfer a list of one or more runnable applications to be interacted with the head unit 120 to be explained below.

(viii) In accordance with an example embodiment of the present invention, the connection enabler application 115 may automatically create the list of one or more runnable applications to be interacted with the head unit 120 which are selected among the one or more applications 114 installed in the terminal 110 at a step of S560. More specifically, the processing part 310 may allow the connection enabler application 115 that receives the broadcast of the status of connection with the head unit 120 to create the list of one or more runnable applications in the head unit 120. In other words, the processing part 310 may automatically create the list of one or more runnable applications to be interacted with the head unit 120 which are selected among the one or more runnable applications 114 installed in the terminal 110.

(ix) Next, in accordance with an example embodiment of the present invention, the connection enabler application 115 may transfer the created list of one or more applications to the application list management module 123 of the head unit 120 at a step of S565. More specifically, the communication part 320 of the terminal 110 may allow the connection enabler application 115 to transfer the created list of one or more applications to the application list management module 123 of the head unit 120. In brief, the communication part 320 may transfer the created list of one or more applications to the communication part 420 of the head unit 120. The list may be transferred to the head unit 120 through the connection with the application list management module 123 explained at the step of S550.

The application list management module 123 of the head unit 120 may receive the list of one or more applications from the connection enabler application 115. More specifically, the communication part 420 of the head unit 120 may allow the application list management module 123 to receive the list of one or more applications from the connection enabler application 115. That is to say, the communication part 420 may receive the list of one or more applications created by the connection enabler application 115 from the communication part 320 of the terminal 110.

As explained above, as the connection with the head unit 120 is detected, the step S560 of creating the list of one or more runnable applications to be interacted with the head unit 120 and the step S565 of transferring the list may be automatically taken without any operation by the user. In addition, the steps of S560 and S565 may be performed if the processing part 310 executes code of the connection enabler application 115 installed in the terminal 110 and the communication part 320 operates by the execution of the code of the connection enabler application 115.

(x) Next, in accordance with an example embodiment of the present invention, the application list management module 123 may display information on the one or more applications to be interacted with the head unit 120 by referring to the received list of the one or more applications at a step of S570, where the information on the one or more applications may include at least one of name, symbol, and icon of the one or more runnable applications to be interacted with the head unit 120. In other words, the display part 440 of the head unit 120 may display the information on one or more runnable applications to be interacted with the head unit 120 by referring to the aforementioned list.

Figure 6:
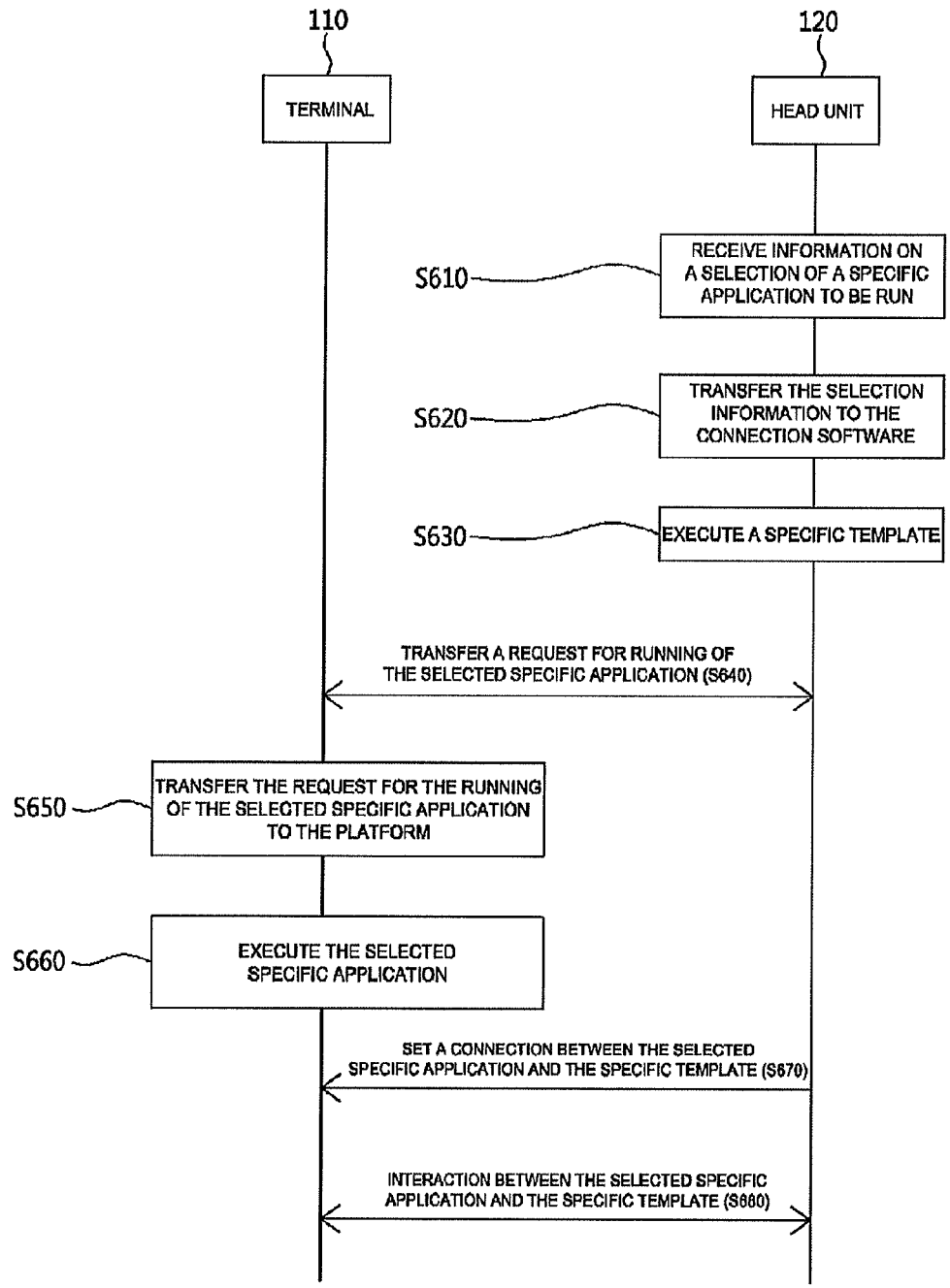
FIG. 6 is a flowchart of a method for running an application through interaction between the terminal and the head unit of the system in accordance with an example embodiment of the present invention.

FIG. 6 is a flowchart of a method for running an application through interaction between the terminal and the head unit of the system in accordance with an example embodiment of the present invention.

The steps of S610 to S680 to be explained later may be performed after the prescribed steps of S510 to S570 of FIG. 5.

(i) First of all, in accordance with an example embodiment of the present invention, the application list management module 123 may receive information on a selection of a specific application to be run among the one or more applications to be interacted with the head unit 120 from the user of the head unit 120 at a step of S610. In short, the input part 430 of the head unit 120 may receive the selection information on the specific application to be run thereamong from the user of the head unit 120.

(ii) Next, in accordance with an example embodiment of the present invention, the application list management module 123 may transfer the selection information to the connection software 122 at a step of S620. More specifically, if the application list management module 123 receives the selection information, the processing part 410 of the head unit 120 may allow the application list management module 123 to transfer the selection information to the connection software 122. In other words, the processing part 410 of the head unit 120 may transfer the selection information to the connection software 122.

(iii) In accordance with an example embodiment of the present invention, the connection software 122 may execute a specific template corresponding to the selected specific application among the one or more templates 124 by referring to the selection information at a step of S630. More specifically, the processing part 410 may allow the connection software 122 to execute the specific template corresponding to the selected specific application among the one or more templates 124 by using the selection information. In short, the processing part 410 may execute a template application in order to display the specific template corresponding to the selected specific application among the one or more templates 124 by using the selection information.

(iv) Besides, in accordance with an example embodiment of the present invention, the connection software 122 of the head unit 120 may transfer a request for running of the selected specific application to the connection software 113 of the terminal 110 at a step of S640. More specifically, the communication part 420 of the head unit 120 may allow the connection software 122 thereof to transfer the request for the running of the selected specific application to the connection software 113 of the terminal 110. In other words, the communication part 420 of the head unit 120 may transfer the request for the running of the selected specific application to the communication part 420 of the terminal 110. The connection software 113 of the terminal 110 may receive the request for the running of the selected specific application from the connection software 122 of the head unit 120. More specifically, the communication part 420 of the terminal 110 may allow the connection software 113 of the terminal 110 to receive the request for the running of the selected specific application from the connection software 122 of the head unit 120. In other words, the communication part 420 of the terminal 110 may receive the request for the running of the selected specific application from the communication part 420 of the head unit 120.

If the terminal 110 receives the request for the running of the selected specific application, the terminal 110 may run the selected specific application by interacting with the specific template executed in the head unit 120 through the steps of S650 to S680 to be explained below.

(v) In accordance with an example embodiment of the present invention, the connection software 113 of the terminal 110 may additionally transfer the request for the running of the selected specific application to the platform 112 of the terminal 110 at a step of S650. More specifically, the processing part 310 of the terminal 110 may allow the connection software 113 to transfer the request for the running of the selected specific application to the platform 112 of the terminal 110. In other words, the processing part 310 may transfer the request for the running of the selected specific application to the platform 112.

(vi) Next, in accordance with an example embodiment of the present invention, the platform 112 may execute the selected specific application by using the running information, and provide an execution environment for the selected specific application at a step of S660. More concretely, the processing part 310 of the terminal 110 may allow the platform 112 to execute the selected specific application by using the running information and provide the execution environment for the selected specific application. In other words, the processing part 310 may execute the selected specific application by using the running information and provide the execution environment for the selected specific application.

In accordance with an example embodiment of the present invention, the platform 112 may also test whether the selected specific application is appropriate to be run by interacting with the specific template executed in the head unit 120. The platform 112 may also test whether the selected specific application is appropriate to be run by interacting with the specific template executed in the head unit 120 by using the running information. If the selected specific application is appropriate to be run by interacting with the specific template executed in the head unit 120, the platform 112 may also execute the selected specific application. If the selected specific application is not appropriate to be run by interacting with the specific template executed in the head unit 120, the platform 112 may also give a notification on non-existence of application(s) appropriate to be run by interacting with the specific template executed in the head unit 120 through the connection software 113.

More specifically, the processing part 410 may also allow the platform 112 to test whether the selected specific application is appropriate to be run by interacting with the specific template executed in the head unit 120. In other words, the processing part 410 may also test whether the selected specific application is appropriate to be run by interacting with the specific template executed in the head unit 120. The processing part 410 may test whether the selected specific application is appropriate to be run by interacting with the specific template executed in the head unit 120 by using the running information. If the selected specific application is appropriate to be run by interacting with the specific template executed in the head unit 120, the processing part 410 may execute the selected specific application as well. If the selected specific application is not appropriate to be run by interacting with the specific template executed in the head unit 120, the processing part 410 may give notification on non-existence of application(s) appropriate to be run by interacting with the specific template executed in the head unit 120 through the communication part 420.

(vii) Next, in accordance with an example embodiment of the present invention, a connection between the selected specific application executed in the terminal 110 and the specific template executed in the head unit 120 may be set at a step of S670. If the connection is set, the specific application may be run by interacting with the specific template. For example, if the connection between the specific application and the specific template is set, the specific application may transfer data for initial display to the specific template and the head unit 120 may display the transferred data through the executed specific template.

More specifically, the communication part 320 of the terminal 110 and the communication part 420 of the head unit 120 may set the connection between the specific application executed in the terminal 110 and the specific template executed in the head unit 120. If the connection is set, the processing part 310 of the terminal 110 and the processing part 410 of the head unit 120 may run the specific application and the specific template by interacting them with each other. For example, if the connection between the specific application and the specific template is set, the communication part 320 of the terminal 110 may transfer the data for initial display to the communication part 420 of the head unit 120 and the display part 440 of the head unit 120 may display the transferred data through the executed specific template.

(viii) Next, in accordance with an example embodiment of the present invention, the selected specific application executed in the terminal 110 and the specific template executed in the head unit 120 may be interacted with each other and then be run at a step of S680. More specifically, the processing part 310 of the terminal 110 and the processing part 410 of the head unit 120 may allow the selected specific application executed in the terminal 110 and the specific template executed in the head unit 120 to be interacted with each other and then be run. In other words, the processing part 310 of the terminal 110 may run the selected specific application in the specific template executed in the head unit 120 through the interaction with the head unit 120. The processing part 410 of the head unit 120 may run the selected specific application in the specific template executed in the head unit 120 through the interaction with the terminal 110.

In accordance with an example embodiment of the present invention, the user may get the service of the selected specific application through the head unit 120 and also only by operating the head unit 120 through the above-stated steps of S610 to S680.

In accordance with an example embodiment of the present invention, if the specific application to be run is once selected by the user, the above-stated steps of S610 to S680 may be taken automatically without any interaction with the user. The operation of the specific application run through the interaction, including the selection of the specific application to be run, may be performed only through the head unit 120.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

The present invention brings the effect of providing an application service corresponding with an application while reducing the unnecessary action and excessive interaction of the user in an environment where the terminal and the head unit are connected.

In accordance with the present invention, a variety of applications of the smart phone by the connection enabler application automatically executed, if the terminal is connected with the head unit, may be provided and the safer and richer application services may be provided in a diversity of environments such as a driving environment to provide application which minimizes the user engagement.

In accordance with the present invention, the application services can be operated only through the templates of the head unit.

What is claimed is:

1. A method for automatically providing a service of an application installed in a terminal by an interaction with the terminal; comprising the steps of:
    (a) a head unit receiving, from the terminal, a list including information on one or more runnable applications to be interacted with the head unit selected among one or more applications installed in the terminal, when a connection of a communication channel between the terminal and the head unit is detected;
    (b) the head unit executing a template application corresponding to a specific application when the specific application is selected by a user of the head unit from the list of one or more runnable applications to be interacted with the head unit, and transferring a request for the running of the selected specific application to the terminal; and
    (c) the head unit causing a state of the selected specific application run on the terminal to be displayed through a specific template provided by the template application through the interaction with the terminal.

2. The method of claim 1, further comprising the steps of:
    (a1) a head unit being connected with the terminal; and
    (a2) when the terminal detects a connection of a communication channel with the head unit and automatically creates the list,
    wherein the steps (a1) and (a2) are performed before the step (a).

3. The method of claim 2, wherein, at the step of (a2), when the terminal transfers a notification on the detected connection of the communication channel to its platform and the platform is allowed to broadcast the connection status with the head unit to the one or more applications installed in the terminal, including a connection enabler application; and then if the connection enabler application automatically creates the list of one or more applications to be interacted with the head unit, the head unit receives the list of one or more runnable applications to be interacted therewith from the terminal.

4. The method of claim 3, (a) further comprising the steps of:
- (aa) the head unit receiving a request for a connection to an application list management module from the connection enabler application, when the connection enabler application receives the broadcast of the connection status therewith and then executes by itself; and
- (ab) the head unit supporting the connection enabler application to be connected with the application list management module, wherein the head unit receives the list of one or more runnable applications to be interacted therewith if the list is created by the connection enabler application.

5. The method of claim 1, wherein the request for the running of the specific application includes running information and the specific application is executed in the terminal by referring to the running information.

6. The method of claim 1, wherein the template application provides the specific template with a user interface corresponding to the specific application among one or more templates of the head unit.

7. A head unit for automatically providing a service of an application installed in a terminal by an interaction with the terminal, comprising:
- a communication part for receiving, from the terminal, a list including information on one or more runnable applications to be interacted with the head unit to be selected via the head unit among one or more applications installed in the terminal, when a connection of a communication channel between the terminal and the head unit is detected; and
- a processing part for executing a template application corresponding to a specific application, when selected by a user of the head unit from the list of one or more runnable applications to be interacted with the head unit, and transferring a request for running of the selected specific application to the terminal, and then allowing a state of the selected specific application run on the terminal to be displayed through a specific template provided by the template application through the interaction with the terminal.

8. The head unit of claim 7, wherein the communication part detects a connection with the terminal, and wherein the processing part receives the list of one or more runnable applications to be interacted with the terminal selected among one or more applications installed in the terminal from the terminal if a connection of the communication channel between the terminal and the head unit is detected and the list is automatically created by the terminal.

9. The head unit of claim 8, wherein, when the terminal transfers a notification on the detected connection of the communication channel to its platform and the platform broadcasts the connection status with the head unit to the one or more applications installed in the terminal, including a connection enabler application, and the connection enabler application automatically creates the list of one or more runnable applications to be interacted with the head unit, the processing part receives the list.

10. The head unit of claim 9, wherein, if the connection enabler application of the terminal receives the broadcast of the connection status with the head unit and then the connection enabler application executes itself, the communication part receives a request for a connection to an application list management module of the head unit from the connection enabler application, supports the connection enabler application to be connected with the application list management module and receives the list of one or more runnable applications to be interacted with the head unit if the list is created by the connection enabler application.

11. The head unit of claim 7, wherein the request for the running of the specific application includes running information and the specific application is executed in the terminal by referring to the running information.

12. The head unit of claim 7, wherein the template application provides the specific template with a user interface corresponding to the specific application among one or more templates of the head unit.

\* \* \* \* \*